(12) United States Patent
Cunningham et al.

(10) Patent No.: US 10,161,418 B2
(45) Date of Patent: *Dec. 25, 2018

(54) COUPLING AN ELECTRIC MACHINE AND FLUID-END

(75) Inventors: Christopher E. Cunningham, Spring, TX (US); Co Si Huynh, Brea, CA (US)

(73) Assignee: FMC Technologies, Inc., Houston, TX (US)

( * ) Notice: Subject to any disclaimer, the term of this patent is extended or adjusted under 35 U.S.C. 154(b) by 533 days.

This patent is subject to a terminal disclaimer.

(21) Appl. No.: 14/427,920

(22) PCT Filed: Sep. 12, 2012

(86) PCT No.: PCT/US2012/054843
§ 371 (c)(1),
(2), (4) Date: Jul. 17, 2015

(87) PCT Pub. No.: WO2014/042628
PCT Pub. Date: Mar. 20, 2014

(65) Prior Publication Data
US 2015/0316072 A1 Nov. 5, 2015

(51) Int. Cl.
*F04D 29/64* (2006.01)
*F04D 3/00* (2006.01)
(Continued)

(52) U.S. Cl.
CPC .......... *F04D 29/648* (2013.01); *F04D 3/005* (2013.01); *F04D 13/024* (2013.01); *F04D 13/08* (2013.01);
(Continued)

(58) Field of Classification Search
CPC ...... F04D 29/648; F04D 3/005; F04D 13/024; F04D 13/08; F04D 13/086; F04D 29/046;
(Continued)

(56) References Cited

U.S. PATENT DOCUMENTS 2,356,482 A 8/1944 Thrush
2,577,559 A 12/1951 Armstrong
(Continued)

FOREIGN PATENT DOCUMENTS

CN 1694335 A 11/2005
CN 101675248 A 3/2010
(Continued)

OTHER PUBLICATIONS

Office Action issued in Australian Application No. 2012389803 dated Nov. 28, 2016; 4 pages.
(Continued)

*Primary Examiner* — Kenneth J Hansen
*Assistant Examiner* — Benjamin Doyle
(74) *Attorney, Agent, or Firm* — Fish & Richardson P.C.

(57) ABSTRACT

A submersible fluid system for operating submerged in a body of water includes a fluid-end that has a fluid rotor disposed in a fluid-end housing. An electric machine housing is coupled to the fluid-end housing and includes a hermetically sealed cavity. An electric machine, such as a motor and/or generator, is disposed entirely within the cavity of the electric machine housing. The electric machine includes an electric machine stator and an electric machine rotor. A magnetic coupling couples the electric machine rotor and the fluid rotor.

23 Claims, 5 Drawing Sheets

(51) Int. Cl.
| | | |
|---|---|---|
| *F04D 13/08* | (2006.01) | |
| *F04D 29/52* | (2006.01) | |
| *F04D 29/08* | (2006.01) | |
| *F04D 29/046* | (2006.01) | |
| *H02K 49/10* | (2006.01) | |
| *F04D 13/02* | (2006.01) | |

(52) U.S. Cl.
CPC ......... *F04D 13/086* (2013.01); *F04D 29/046* (2013.01); *F04D 29/086* (2013.01); *F04D 29/528* (2013.01); *H02K 49/106* (2013.01); *Y10T 29/49828* (2015.01)

(58) Field of Classification Search
CPC .... F04D 29/086; F04D 29/528; F04D 13/025; F04D 3/00; H02K 49/106; Y10T 29/49828
USPC .............................................. 417/420, 423.3
See application file for complete search history.

(56) References Cited

U.S. PATENT DOCUMENTS

| | | | | |
|---|---|---|---|---|
| 2,947,259 A * | 8/1960 | Wright | ............... | F02M 37/10 310/104 |
| 2,968,248 A * | 1/1961 | Carter | ............... | F02M 37/08 417/420 |
| 2,970,548 A * | 2/1961 | Berner | ............... | H02K 5/128 310/104 |
| 2,996,994 A * | 8/1961 | Wright | ............... | F02M 37/08 310/104 |
| 3,074,347 A * | 1/1963 | Clymer | ............... | F02M 37/10 222/333 |
| 3,213,736 A | 10/1965 | Keeton | | |
| 3,411,450 A * | 11/1968 | Clifton | ............... | F04D 13/024 310/104 |
| 3,520,642 A * | 7/1970 | Fulton | ............... | H02K 49/00 310/104 |
| 3,802,804 A * | 4/1974 | Zimmermann | ............... | F04D 7/06 417/360 |
| 3,816,513 A | 6/1974 | Wakamatsu et al. | | |
| 4,080,112 A * | 3/1978 | Zimmermann | ............... | F04D 1/006 415/104 |
| 4,235,569 A * | 11/1980 | Wegner | ............... | F04D 13/021 376/402 |
| 4,266,914 A * | 5/1981 | Dickinson | ............... | F04D 13/024 417/360 |
| 4,276,002 A | 6/1981 | Anderson | | |
| 4,358,247 A | 11/1982 | Suzuki et al. | | |
| 4,411,599 A | 10/1983 | Kessel | | |
| 4,526,518 A * | 7/1985 | Wiernicki | ............... | F02M 37/08 417/420 |
| 4,752,194 A * | 6/1988 | Wienen | ............... | H02K 49/106 417/420 |
| 4,834,624 A | 5/1989 | Jensen et al. | | |
| 4,969,803 A | 11/1990 | Turanskyj | | |
| 4,998,863 A * | 3/1991 | Klaus | ............... | F04D 15/0263 417/420 |
| 5,090,944 A * | 2/1992 | Kyo | ............... | B01F 13/0827 417/420 |
| 5,248,245 A * | 9/1993 | Behnke | ............... | F04D 29/061 415/110 |
| 5,297,940 A * | 3/1994 | Buse | ............... | F04D 15/0272 417/420 |
| 5,302,091 A * | 4/1994 | Horiuchi | ............... | F04D 29/0413 415/111 |
| 5,310,265 A | 5/1994 | Stangeland et al. | | |
| 5,334,004 A * | 8/1994 | Lefevre | ............... | F01D 11/04 277/358 |
| 5,398,762 A | 3/1995 | Stinessen | | |
| 5,485,905 A * | 1/1996 | Rader, III | ............... | B62M 11/00 192/41 A |
| 5,642,989 A | 7/1997 | Keddie | | |
| 5,660,520 A | 8/1997 | Scarsdale | | |
| 5,779,456 A * | 7/1998 | Bowes | ............... | F04D 13/027 417/420 |
| 6,059,539 A | 5/2000 | Nyilas | | |
| 6,213,736 B1 * | 4/2001 | Weisser | ............... | F04D 13/083 417/410.1 |
| 6,293,772 B1 * | 9/2001 | Brown | ............... | F04D 13/026 415/122.1 |
| 6,322,335 B1 * | 11/2001 | Shi | ............... | F04D 29/0413 415/172.1 |
| 6,443,710 B1 * | 9/2002 | Tatsukami | ............... | F04D 29/0413 417/365 |
| 6,520,745 B1 | 2/2003 | Yamamoto | | |
| 6,655,930 B2 * | 12/2003 | Sato | ............... | F04D 7/02 417/373 |
| 6,702,554 B1 * | 3/2004 | Sørensen | ............... | F04D 13/08 415/229 |
| 6,722,858 B2 | 4/2004 | Yoshimura et al. | | |
| 6,863,124 B2 * | 3/2005 | Araux | ............... | E21B 43/128 166/105 |
| 7,001,063 B1 * | 2/2006 | Markle | ............... | H02K 49/106 273/331 |
| 7,011,152 B2 | 3/2006 | Soelvik | | |
| 7,137,793 B2 * | 11/2006 | Shafer | ............... | F04C 2/101 417/420 |
| 7,178,592 B2 | 2/2007 | Chitty et al. | | |
| 7,325,606 B1 | 2/2008 | Vail et al. | | |
| 7,370,697 B1 | 5/2008 | Sakamoto | | |
| 7,429,809 B2 * | 9/2008 | Huster | ............... | F04D 13/06 310/52 |
| 7,530,391 B2 | 5/2009 | Hall | | |
| 7,549,205 B2 * | 6/2009 | Shafer | ............... | H02K 49/106 29/446 |
| 7,741,744 B2 | 6/2010 | Watson | | |
| 7,950,906 B2 | 5/2011 | Hall, Jr. | | |
| 8,096,353 B2 | 1/2012 | Ver | | |
| 8,210,835 B2 * | 7/2012 | Asaka | ............... | B60S 1/50 239/284.1 |
| 8,257,055 B2 | 9/2012 | Beg et al. | | |
| 2002/0054820 A1 * | 5/2002 | Fukamachi | ............... | F04D 13/027 417/420 |
| 2003/0132003 A1 * | 7/2003 | Arauz | ............... | E21B 43/128 166/370 |
| 2004/0144534 A1 | 7/2004 | Lee | | |
| 2004/0223864 A1 * | 11/2004 | Miller | ............... | F04C 15/0069 417/420 |
| 2005/0019182 A1 * | 1/2005 | Klein | ............... | F04D 29/026 417/420 |
| 2005/0089419 A1 * | 4/2005 | Arauz | ............... | E21B 43/128 417/420 |
| 2005/0093382 A1 | 5/2005 | Hirth | | |
| 2005/0142003 A1 * | 6/2005 | Hembree | ............... | F04D 13/025 417/365 |
| 2005/0214141 A1 * | 9/2005 | Huster | ............... | F04D 13/06 417/423.8 |
| 2006/0157251 A1 | 7/2006 | Stinessen et al. | | |
| 2006/0175064 A1 | 8/2006 | Yuratich | | |
| 2006/0210412 A1 * | 9/2006 | Lawyer | ............... | F04D 29/628 417/420 |
| 2007/0048157 A1 | 3/2007 | Collins | | |
| 2008/0128128 A1 | 6/2008 | Vail et al. | | |
| 2008/0314616 A1 | 12/2008 | Benestad et al. | | |
| 2009/0098003 A1 | 4/2009 | Kothnur et al. | | |
| 2009/0263265 A1 | 10/2009 | Mathijssen | | |
| 2010/0074777 A1 * | 3/2010 | Laufer | ............... | F04D 13/12 417/420 |
| 2010/0143166 A1 * | 6/2010 | Head | ............... | E21B 43/128 417/390 |
| 2010/0201129 A1 * | 8/2010 | Holstein | ............... | F03B 13/264 290/53 |
| 2010/0278672 A1 | 11/2010 | Kothnur et al. | | |
| 2010/0284829 A1 | 11/2010 | Sloteman et al. | | |
| 2011/0024195 A1 | 2/2011 | Hoyer et al. | | |
| 2011/0044831 A1 * | 2/2011 | Cunningham | ............... | F04D 1/063 417/410.1 |
| 2011/0050017 A1 | 3/2011 | Cunningham | | |

(56) References Cited

U.S. PATENT DOCUMENTS

| | | | |
|---|---|---|---|
| 2011/0052432 A1* | 3/2011 | Cunningham | F04D 13/10 |
| | | | 417/423.3 |
| 2011/0058965 A1 | 3/2011 | Cunningham | |
| 2011/0155385 A1 | 6/2011 | Håheim | |
| 2012/0048113 A1 | 3/2012 | Anderson et al. | |
| 2012/0055335 A1 | 3/2012 | Mateman | |
| 2012/0100014 A1 | 4/2012 | Seitter | |
| 2012/0103188 A1 | 5/2012 | Stinessen | |
| 2012/0132079 A1 | 5/2012 | Naess et al. | |
| 2012/0308408 A1 | 12/2012 | Rosvold | |
| 2013/0043034 A1 | 2/2013 | Drablier | |
| 2014/0023535 A1* | 1/2014 | Hoshi | F04D 13/025 |
| | | | 417/420 |
| 2014/0158320 A1* | 6/2014 | Archer | F28D 7/06 |
| | | | 165/45 |
| 2014/0186203 A1* | 7/2014 | Hoshi | F04D 13/0633 |
| | | | 417/420 |
| 2015/0316072 A1* | 11/2015 | Cunningham | F04D 13/024 |
| | | | 417/420 |
| 2015/0322756 A1* | 11/2015 | Cunningham | E21B 43/128 |
| | | | 417/53 |
| 2015/0326094 A1* | 11/2015 | Cunningham | E21B 41/0007 |
| | | | 310/87 |
| 2015/0345265 A1* | 12/2015 | Cunningham | F04D 13/083 |
| | | | 415/1 |

FOREIGN PATENT DOCUMENTS

| | | |
|---|---|---|
| CN | 201650775 U | 11/2010 |
| DE | 858196 C | 12/1952 |
| FR | 2480360 A1 | 10/1981 |
| FR | 2609118 | 7/1988 |
| FR | 2646882 | 11/1990 |
| RU | 2303161 C1 | 7/2007 |
| RU | 2409770C2 C2 | 1/2011 |
| SU | 787583 A1 | 12/1980 |
| WO | WO0133083 A1 | 5/2001 |
| WO | WO2009073414 A2 | 6/2009 |
| WO | WO2009137316 A1 | 11/2009 |
| WO | WO2009137323 A1 | 11/2009 |
| WO | WO2010129749 A1 | 11/2010 |
| WO | WO2011161516 A1 | 12/2011 |
| WO | WO2012034984 A2 | 3/2012 |
| WO | WO2012121605 A1 | 9/2012 |
| WO | WO 2012/141599 A1 | 10/2012 |
| WO | WO 2013/028594 A2 | 2/2013 |

OTHER PUBLICATIONS

International Search Report and Written Opinion of the International Searching Authority issued in International Application No. PCT/US2012/054843 dated Jun. 20, 2013; 8 pages.

Intellectual Property Office of Singapore, Invitation to Respond to Written Opinion, Singapore Application No. 11201501908W, dated Jan. 19, 2016, 10 pages.

Examination Report No. 2 issued in Australian Application No. 2012389803 dated Jul. 12, 2017, 3 pages.

Intellectual Property of Singapore, Invitation to Respond to Written Opinion, Singapore Application No. 11201501908W, dated Jun. 20, 2017, 10 pages.

Notice of Allowance issued in Australian Application No. 2012389803 dated Oct. 27, 2017; 7 pages.

* cited by examiner

COUPLING AN ELECTRIC MACHINE AND FLUID-END

CLAIM OF PRIORITY

This application is a U.S. National Stage of PCT/US2012/054843 filed on Sep. 12, 2012.

BACKGROUND

Operation of fluid systems such as pumps, compressors, mixers, separators and other such systems submerged underwater is difficult because the operating environment is harsh, particularly if that environment is deep seawater. The water surrounding the system and often the process fluid flowing through the system is corrosive. The ambient environment can be cold, making many materials brittle and causing large thermal expansion/contraction of equipment as the equipment cycles between hot operating and cold not-operating states. The hydrostatic pressure of the water and/or process fluid can be substantial. Furthermore, installation and access to the fluid systems for maintenance and repair is difficult and expensive because the systems are often deployed in geographically remote locations and at depths inaccessible by divers, therefore requiring purpose-built vessels, skilled personnel and robotic equipment.

SUMMARY

The concepts herein encompass a submersible fluid system for operating submerged in a body of water. The submersible fluid system includes a fluid-end that has a fluid rotor disposed in a fluid-end housing. An electric machine housing is coupled to the fluid-end housing and includes a hermetically sealed cavity. An electric machine, such as a motor and/or generator, is disposed entirely within the cavity of the electric machine housing. The electric machine includes an electric machine stator and an electric machine rotor. A magnetic coupling couples the electric machine rotor and the fluid rotor.

The concepts herein encompass a method of coupling an electric machine to a fluid-end of a submersible fluid system. According to the method, a rotor of the electric machine is maintained in an area of a first pressure that is hermetically sealed from a fluid rotor of the fluid-end. The fluid rotor of the fluid-end resides in an area of a second, different pressure. The rotor of the electric machine is coupled to the fluid rotor with a (touchless) magnetic coupling through a stationary wall between the rotor of the electric machine and the fluid rotor. The (touchless) magnetic coupling causes the fluid rotor to move with the rotor of the electric machine or vice versa.

The concepts herein encompass a submersible fluid-end. The has a shaft contained in a submersible fluid-end housing. The shaft has a permanent magnet. The has a rotor extending into the electric machine. The motor has a rotor permanent magnet and the rotor resides in a hermetically sealed cavity defined by an electric machine housing. The permanent magnet resides proximate the rotor permanent magnet communicating magnetic flux between the permanent magnet and the pump permanent magnet to couple the shaft with the rotor shaft.

The concepts above can encompass some, none or all of the following features.

In certain instances, an end of the fluid rotor can extend into an interior bore of the electric machine rotor and a magnet is coupled to an exterior of the end of the fluid rotor. Another magnet is coupled to the electric machine rotor, and resides in the interior bore the electric machine rotor. A wall is provided between the magnets. In certain instances, the wall includes a substantially non-magnetically conductive cylinder. In certain instances, a support can be provided that extends from an end of the electric machine housing towards the fluid-end housing that clamps the cylinder between the support and the fluid-end housing. The support can be springingly biased towards the fluid-end housing. In certain instances, a fluid passage can be provided through the support and into an interior of the cylinder. The fluid passage can be coupled to receive fluid from an exterior of the fluid system and communicate the fluid to an interior of the cylinder. In certain instances, that fluid can be substantially gas. In certain instances, the cylinder can be an inner sleeve made of gas impermeable ceramic or glass within a fiber-matrix composite outer sleeve. In certain instances, the outer sleeve can compressively strain the inner sleeve. In certain instances, the sleeve can include a seal surface about one end and a seal surface about an opposing end.

In certain instances, the sealed cavity of the electric machine housing can contain gas at a pressure of about one atmosphere, and an interior of the cylinder can contain a fluid at a pressure of about the pressure of the fluid entering the fluid rotor at the fluid-end. In certain instances the seals sealing the cavity from the fluid-end housing are entirely static seals. In certain instances, the electric machine includes a magnetic bearing supporting the electric machine rotor to rotate within the electric machine stator. The magnetic bearing can be wholly contained within the sealed cavity. In certain instances the fluid-end can contain a fluid-film type bearing supporting the fluid rotor. In certain instances, the electric machine rotor includes a permanent magnet that interacts with the stator of the electric machine to rotate the electric machine rotor relative to the stator and/or to generate electricity when rotated relative to the stator. In certain instances the electric machine is a motor and the fluid rotor is a pump rotor.

DETAILED DESCRIPTION

Figure 1:
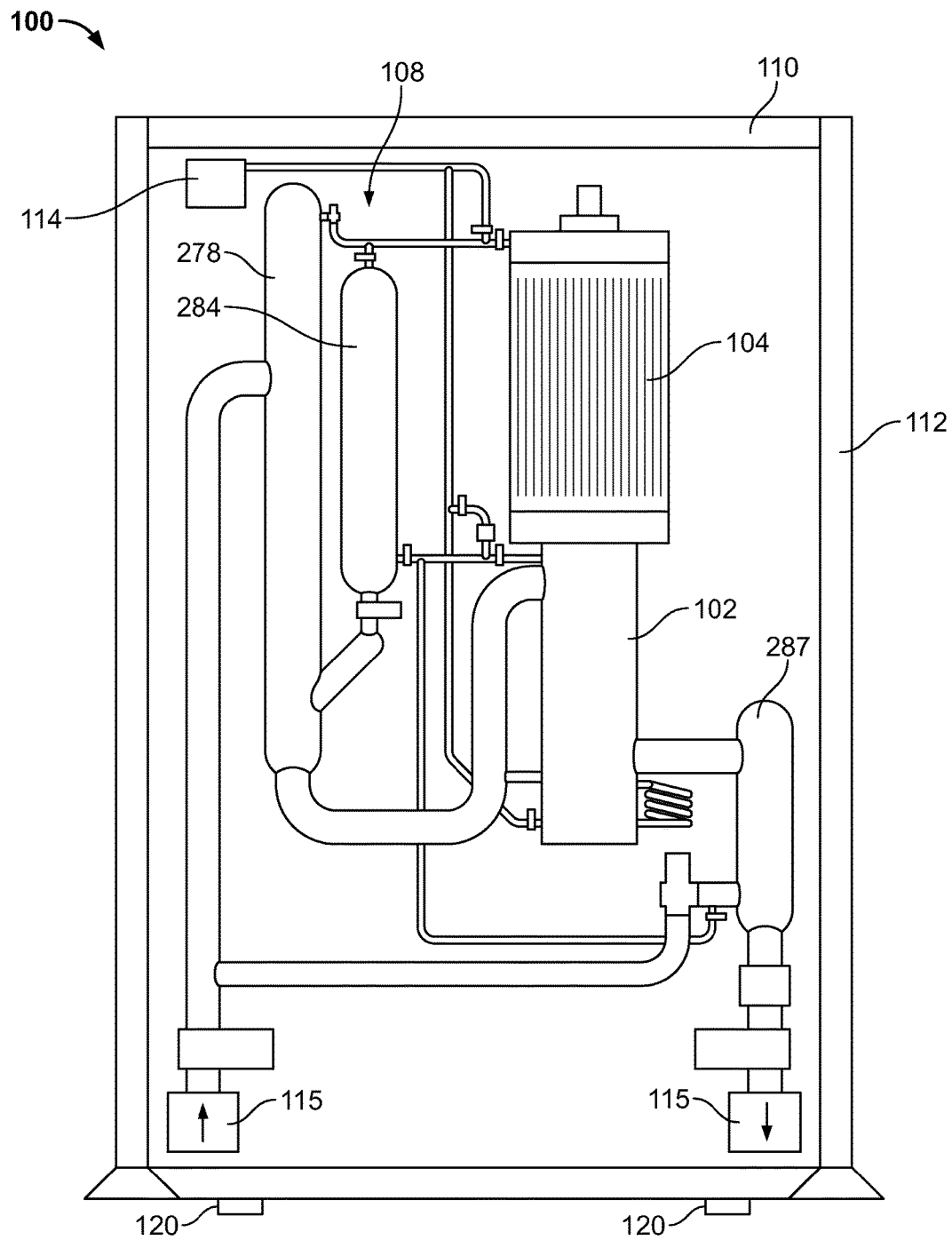
FIG. 1 is a side view of an example fluid system.

Fluid systems of the type disclosed herein act on fluids ("process fluids") that may comprise substantially single phases, e.g. water, oil or gas, or a mixture of more than one phase ("multiphase") that may include two or more phases and often entrained solids, e.g. sand, metal particles and/or rust flakes, wax and/or scale agglomerations, etc. FIG. 1 is a side view of an example fluid system. FIG. 1 depicts an example fluid system 100 constructed in accordance with the concepts described herein. The fluid system 100 includes a fluid-end 102 coupled to an electric machine 104. In certain instances, the fluid system 100 may also include a fluid separator system 108.

Fluid system 100 may be operated submerged in open water e.g. outside of a hydrocarbon production or injection well in a lake, river, ocean or other body of water. To this end, fluid-end 102 and electric machine 104 are packaged within a pressure vessel sealed to prevent passage of fluid between the interior of the pressure vessel and the surrounding environment (e.g. surrounding water). Fluid system 100 components are constructed to withstand ambient pressure about fluid system 100 and thermal loads exerted by the surrounding environment, as well as pressures and thermal loads incurred in operating electric machine 104 and fluid-end 102.

In certain instances, e.g. subsea applications, fluid-end 102, electric machine 104 and fluid separator system 108 may be carried on a skid 110 or other structure of fluid system 100 that aligns with, and engages other subsea structures, e.g. by way of guide tubes 112 that capture guide posts of a corresponding subsea structure, or through interaction of a large cone-to-cone-plus-pin-and-cam arrangement (not shown but familiar to those skilled in the art of guidelineless subsea systems). When the fluid system is referred to as a "subsea" fluid system, it is not to say that the fluid system is designed to operate only under the sea. Rather, the subsea fluid system is of a type that is designed to operate under the rigors encountered at or near the bottom of an open body of water, such as an ocean, a lake, a river or other body of salt or fresh water. An auxiliary source of liquids 114 can be interfaced to skid 110 to provide liquids to the system, e.g. corrosion, scale and hydrate inhibiting chemicals.

One or more dampers 120 may be affixed external to the fluid system 100 to damp impact of the fluid system 100 with surfaces, such as on a subsea structure or a transportation vessel deck. The dampers 120 may be configured to maintain a level orientation of the fluid system 100 in situations where the surface is not level. The dampers 120 may be fluid dampers or other types of shock or impact absorbing devices.

As described in more detail below, electric machine 104 is an alternating current (AC), synchronous, permanent magnet (PM) electric machine having a rotor that includes permanent magnets and a stator that includes a plurality of formed or cable windings and a (typically) stacked-laminations core. In other instances electric machine 104 can be another type of electric machine such as an AC, asynchronous, induction machine where both the rotor and the stator include windings and laminations, or even another type of electric machine. Electric machine 104 can operate as a motor producing mechanical movement from electricity, a generator producing electric power from mechanical movement, or alternate between generating electric power and motoring. In motoring, the mechanical movement output from electric machine 104 can drive fluid-end 102. In generating, fluid-end 102 supplies mechanical movement to electric machine 104, and electric machine 104 converts the mechanical movement into electric power.

In instances where fluid-end 102 is driven by electric machine 104, fluid-end 102 can include any of a variety of different devices. For example, fluid-end 102 can include one or more rotating and/or reciprocating pumps, rotating and/or reciprocating compressors, mixing devices, or other devices. Some examples of pumps include centrifugal, axial, rotary vane, gear, screw, lobe, progressing cavity, reciprocating, plunger, diaphragm and/or other types of pumps. Some examples of compressors include centrifugal, axial, rotary vane, screw, reciprocating and/or other types of compressors, including that class of compressors sometimes referred to as "wet gas compressors" that can accommodate a higher liquid content in the gas stream than is typical for conventional compressors. In other instances fluid-end 102 may include one or more of a fluid motor operable to convert fluid flow into mechanical energy, a gas turbine system operable to combust an air/fuel mixture and convert the energy from combustion into mechanical energy, an internal combustion engine, and/or other type of prime mover. In any instance, fluid-end 102 can be single or multi-stage device.

While FIG. 1 illustrates a vertically-oriented electric machine 104 coupled to a vertically-oriented fluid-end 102, other implementations may provide for a horizontally-oriented electric machine coupled to a horizontally-oriented fluid-end, a vertically-oriented electric machine 104 coupled to a horizontally-oriented fluid-end 102, a horizontally-oriented electric machine 104 coupled to a vertically-oriented fluid-end 102, as well as still other orientations of electric machine 104 and fluid-end 102, including non-in-line and non-perpendicular arrangements.

Although shown with a single fluid-end 102, electric machine 104 can also be coupled to two or more fluid-ends 102 (to drive and/or be driven by the fluid-ends 102). In certain instances, one or more fluid-ends 102 can be provided at each end of electric machine 104, and in any orientation relative to electric machine 104. For example, in a configuration with two fluid-ends 102, one may be provided at one end of electric machine 104 and another provided at an opposing end of electric machine 104, and the fluid-ends 102 may be oriented at different angles relative to electric machine 104. In another example, a configuration with two fluid-ends 102 can have one provided at one end of electric machine 104 and another coupled to the first fluid-end 102. Also, if multiple fluid-ends 102 are provided, they need not all be of the same type of device and they need not operate on the same fluid, i.e., they could operate on different fluids.

Figure 2A:
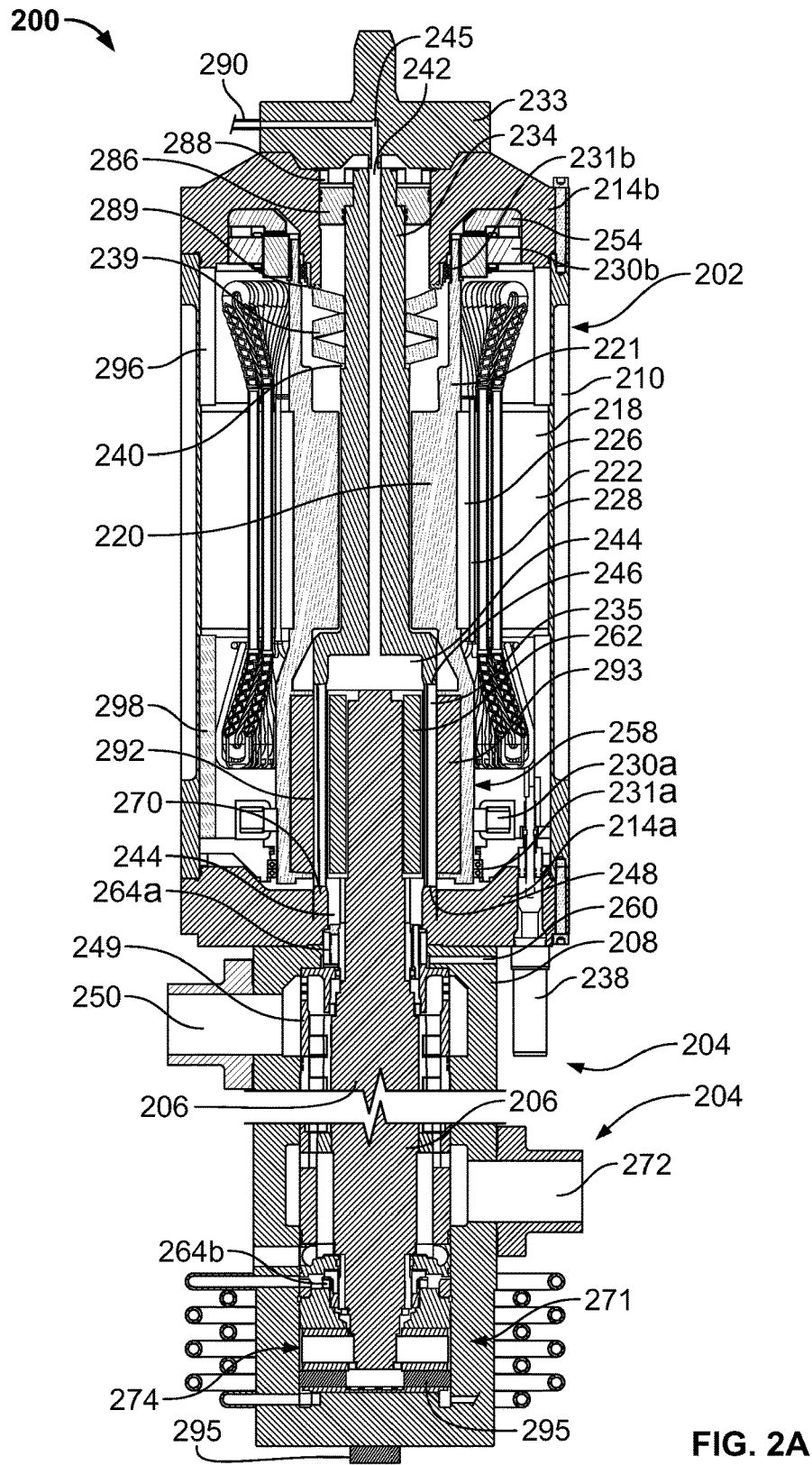
FIG. 2A is a side cross-sectional view of an example integrated electric machine and fluid-end that can be used in the example fluid system of FIG. 1.

FIG. 2A is a side cross-sectional view of an example electric machine 202 and fluid-end 204 that can be used in the example fluid system 100 of FIG. 1. Fluid-end 204 includes a fluid rotor 206 disposed in a fluid-end housing 208. Fluid-end housing 208 contains process fluids flowing from an inlet 250 near electric machine 202 to an outlet 272 distal the electric machine. Electric machine 202 is carried by, and contained within, an electric machine housing 210 attached to fluid-end housing 208 of fluid-end 204 by way of end-bell 214a. Electric machine housing 210 is attached at its upper end to end-bell 214b, which is attached to cap 233. The aforementioned attachments are sealed to create a pressure vessel encapsulating electric machine 202 that prevents passage of fluid between its interior and the surrounding environment (e.g. water). Another collection of parts and interfaces (described later in this disclosure) prevents passage of fluid between electric machine 202 and fluid-end 204. As a result of the mentioned barriers, electric machine 202 operates in its own fluid environment, which may be gas or liquid depending on specific trade-offs (with gas preferred from a system overall efficiency perspective). FIG. 2A depicts a close-coupled submersed fluid system 200 in that electric machine 202 structural elements attach directly to fluid-end 204 structural elements.

Electric machine 202 disposed within electric machine housing 210 includes an electric machine stator 218 and an electric machine rotor 220. Electric machine housing 210 is coupled to the fluid-end housing 208 and includes a hermetically sealed cavity. The cavity has a gas at a pressure less than the hydrostatic pressure at the specified underwater depth. The electric machine 202 is disposed within the cavity of the electric machine housing. Electric machine stator 218 is interfaced with an external power supply by penetrators/connectors 238 which pass-through lower end-bell 214a. It is known to those skilled in the art of underwater electric power interconnect systems that minimizing pressure differential acting across such interfaces is recommended for long-term success. Electric machine rotor 220 is magnetically-coupled to rotate with process fluid rotor 206 with a magnetic coupling 258. In other instances, a mechanical coupling could be used. Electric machine rotor 220, which can be tubular, includes a rotor shaft (or core in the case of an AC machine) 221 and permanent magnets 226 affixed to the exterior of rotor shaft 221, particularly, in an area proximate stator core 222. The magnetic coupling 258 couples the electric machine rotor 220 and the fluid rotor 206 to rotate at the same speed and without contact (i.e., out-of-contact magnetic coupling). The fluid rotor 206 is disposed to rotate in the fluid-end housing 208 and to receive and interact with a process fluid flowing from the inlet 250 to the outlet 272 of the fluid-end housing 208. The fluid rotor 206 is configured to thrust upwards toward the upper end when rotating.

Permanent magnets 226 are secured to rotor shaft 221 by a sleeve 228 including any material and/or material construct that does not adversely affect the magnetic field and that satisfies all other design and functional requirements. In certain instances sleeve 228 can be made from an appropriate non-ferrous metal, e.g. American Iron and Steel Institute (AISI) 316 stainless steel or a nickel chromium alloy, e.g. Inconel (a product of Inco Alloys, Inc.), or it can include a composite construct of high strength fibers such as carbon-fiber, ceramic fiber, basalt fiber, aramid fiber, glass fiber, and/or another fiber in e.g. a thermoplastic or thermoset matrix. Permanent magnets 226 provide a magnetic field that interacts with a magnetic field of stator 218 to at least one of rotate electric machine rotor 220 relative to stator 218 in response to electric power supplied to stator 218, or to generate electricity in stator 218 when rotor 220 is moved relative to stator 218.

Electric machine rotor 220 is supported to rotate in stator 218 by magnetic bearings 230a and 230b separated a significant distance relative to the length of electric machine rotor 220, and typically, but not essentially, proximate the ends of electric machine rotor 220. In at least one alternative to the configuration shown in FIG.2A, magnetic bearing 230a might be positioned closer to stator core 222 such that a substantial portion or even all of magnetic coupling 258 extends beyond magnetic bearing 230a in what is known to those skilled in the art of rotating machinery as an over-hung configuration. Magnetic bearing 230a is a combination ("combo") magnetic bearing that supports electric machine rotor 220 both axially and radially, and magnetic bearing 230b is a radial magnetic bearing. In the case of a vertically-oriented electric machine 202, a passive magnetic lifting device 254 may be provided to carry a significant portion of the weight of electric machine rotor 220 to reduce the capacity required for the axial portion of magnetic combo bearing 230a, enabling smaller size and improved dynamic performance for combo bearing 230a. Machines incorporating magnetic bearings typically also include back-up bearings 231a and 231b to constrain motor rotor 220 while it spins to a stop in the event the magnetic bearings cease to be effective, e.g. due to loss of power or other failure. Back-up bearings 231a, 231b will support motor rotor 220 whenever magnetic bearings 230a, 230b are not energized, e.g. during transportation of fluid system 100. The number, type and/or placement of bearings in electric machine 202 and fluid-end 204 may be different for different fluid system 100 configurations.

Other elements of electric machine 202 are intimately associated with integrated fluid-end 204, and an overview of a few higher-level attributes for submersed fluid system 200 at this juncture may facilitate reader understanding of the functions and integrated operating nature of those other electric machine 202 elements.

Certain embodiments of subsea fluid system 200 may include: An electric machine 202 the contents of which operate in a gas environment at nominally 1-atmosphere pressure delivering lower losses than existing technologies (e.g. while its electric machine housing 210 is exposed externally to potentially deep water and associated high pressure); an electric machine 202 that utilizes magnetic bearings 230a, 230b for additional loss savings compared to machines operating in a submerged liquid environment using e.g. rolling element or fluid-film bearings; a magnetic coupling 258 for which an inner portion 262 is contained in potentially very high pressure process fluid and is isolated from its associated outer portion 293 located inside the nominally 1-atmosphere pressure environment of electric machine 202 by a static (non-rotating) sleeve 235 that along with its associated static (non-rotating) end-seals 246, 248 is able to withstand the large differential pressure acting thereacross; an electric machine 202 that because of its 1-atmosphere operating environment, use of magnetic bearings 230a, 230b, and use of a magnetic coupling(s) 258 to engage its integrated fluid-end(s) 204, produces much less heat during operation compared to other known technologies (used in submersed fluid system 200 applications) and that therefore can transfer its heat to the surrounding environment using passive, durable and low-cost materials and techniques (including no circulated coolant and associated pump-impeller, etc.); a manner of cooling the magnetic coupling 258 that in certain circumstances may allow the process fluids-submerged portion of that coupling to spin inside a gas-core (with accordant lower loss and other benefits); one or more fluid-ends 204 that employ fluid-film bearings 264a, 264b, 274 or any other types of bearings lubricated and cooled by process fluid (e.g., water or oil or a combination thereof) or alternative fluid; one or more fluids-ends 204 that employ bearings 264a, 264b, 274, provided as fluid-film bearings, magnetic bearings or any other types of bearings at those same or different locations, or a combination of any types of bearings; an upper-inlet/lower outlet vertical fluid-end 204 arrangement that provides a sump 271 at its lower-end to secure fluid-film bearings 264b, 274 in a serviceable environment.

While the contents of electric machine 202 was previously described as operating in a nominally 1-atmosphere pressure environment, the fluid system 200 could alternately be configured to maintain the contents of electric machine 202 in an environment compensated to be substantially equal to the pressure of the water around fluid system 200.

While the magnetic coupling 258 was previously described with the inner portion 262 in the process fluid and the outer portion 293 in the nominally 1-atmosphere pressure environment of electric machine 202, as an alternative, the magnetic coupling 258 could be provided with the opposite topology, having an inner portion in the nominally 1-atmosphere pressure environment and an outer portion in the process fluid.

Electric machine housing 210 (and associated parts) plus magnetic coupling 258 combined with sleeve 235 (and associated parts) establish three substantially separate environments that can be exploited for unprecedented value for submersed fluid systems 200, i.e.: A potentially process-gas-environment inside sleeve 235 at the upper end of fluid-end 204 (otherwise process multiphase fluid or liquid); a nominally 1-atmosphere gas environment outside sleeve 235 and inside electric machine housing 210; an underwater environment outside of electric machine housing 210 (and also outside fluid-end housing 208). In an alternative embodiment, the environment inside electric machine housing 210 may be pressurized (e.g. with gas or liquid) a little or a lot (i.e. any of various levels up to and including that of the process fluid), with accordant tradeoffs in overall system efficiency (increased losses), possibly different cross-section for e.g. electric machine housing 210, upper sleeve 296 and lower sleeve 298, reduced cross-section of sleeve 235 and therefore increased efficiency of magnetic coupling 258, different pressure field across e.g. electric power penetrators, different heat management considerations, etc. With the preceding context, additional description will now be provided for electric machine 202 components and other subsea fluid system 200 components.

Consistent with the present disclosure, it is to be understood that process fluid may be used to lubricate and cool fluid-film or other types of bearings 264a, 264b, 274 in fluid-end 204, and to cool magnetic coupling 258. It is further understood that process fluid in liquid form will better satisfy the requirements of process-lubricated-and-cooled bearings (not applicable if fluid-end 204 uses magnetic bearings), and that process fluid containing at least some gas may benefit the coupling-cooling application, i.e. by reducing drag-loss associated with process fluid rotor 206 motion and conducting heat from inside sleeve 235. Process fluid for the noted applications may be sourced from any of, or more than one of, several locations relative to submersed fluid system 200 depending on the properties of the process fluid at such source location(s) (e.g. water, oil, gas, multiphase), the pressure of such source(s) relative to the point of use, and the properties required for fluid at the point of use. For example, process fluid may come from upstream of submersed fluid system 200, such as from buffer tank 278, liquid reservoir 284 or other sources including some not associated with the process stream passing through submersed fluid system 200 and/or some associated with the process stream passing through submersed fluid system 200 that are subject to e.g., pre-conditioning before joining the process stream passing though submersed fluid system 200 (e.g. a well stream that is choked-down to a lower pressure before being co-mingled with one or more lower pressure flow streams including the flow stream ultimately entering submersed fluid system 200). Process fluid may be sourced from within submersed fluid system 200 itself (e.g. from any of submersed fluid system 200 pressure-increasing stages, proximate outlet 272, from sump 271 and/or immediately adjacent the respective desired point of use). Process fluid may be sourced downstream of submersed fluid system 200, e.g. from the downstream process flow stream directly or from liquid extraction unit 287, among others. Non-process-stream fluids may also be used for lubrication and cooling, such as chemicals available at the seabed location (which is normally injected into the process stream to inhibit corrosion and/or the formation of e.g. hydrates and/or deposition of asphaltenes, scales, etc).

In instances where the upstream process fluid is used for lubrication and/or cooling, and the source does not exist at a pressure greater than that at the intended point of use, such process fluid may need to be "boosted." That is, the pressure of such process fluid may be increased using e.g. a dedicated/separate ancillary pump, an impeller integrated with a rotating element inside subsea fluid system 200, or by some other means. In certain implementations the pressure drop across the fluid-end inlet homogenizer (i.e. mixer) 249 can create a pressure bias sufficient to deliver desired fluids from upstream thereof to e.g. upper radial bearing 264a and coupling chamber 244, the latter being the space surrounding magnetic coupling inner portion 262 and residing inside sleeve 235 (this implementation is discussed further herein).

Regardless the process fluid source, it may be refined and/or cleaned prior to being delivered to the point(s) of use. For example, multiphase fluid may be separated into gas, one or more liquid streams, and solids (e.g. sand, metal particles, etc.), with solids typically diverted to flow into fluid-end 204 via its main inlet 250 and/or collected for disposal. Such fluid separation may be achieved using e.g. gravitational, cyclonic centrifugal and/or magnetic means (among other mechanisms) to achieve fluid properties desired for each point of use. After the fluid has been cleaned, it may also be cooled by passing the refined fluid through e.g. thin-walled pipes and/or thin plates separating small channels, etc. (i.e. heat exchangers) exposed to the water surrounding fluid system 200.

Electric machine 202 includes a cap 233 secured to upper end-bell 214b. For the configuration shown in FIG. 2A, stub 234 is pressed downward onto sleeve 235 by spring mechanism 239 reacting between shoulder bearing ring 240 and shoulder bearing ring 289. End-bell 214b, electric machine housing 210, end-bell 214a, fluid-end housing 208, sleeve support ring 270, and various fasteners associated with the preceding items close the axial load path for stub 234 and sleeve 235. Stub 234 contains an internal axial conduit 242 connecting the process environment inside sleeve 235 with a cavity provided between the upper end of stub 234 and the underside of cap 233. Cap 233 includes a conduit 245 connecting that underside cavity with external service conduit 290 which delivers e.g. process-sourced cooling fluid for the coupling (described previously). Pressurized fluid transported through the noted conduits fills the cavity below cap 233 and acts on stub 234 via bellow 288, piston 286 and liquid provided between bellow 288 and piston 286. The sealing diameter of piston 286 is dictated by the sealing diameter of sleeve 235 and the force created by spring mechanism 239, and is specified to ensure a substantially constant compressive axial load on sleeve 235 regardless of, e.g., pressure and temperature acting internal and external to subsea fluid system 200. For other variants of subsea fluid system 200 the afore-mentioned elements are modified to ensure a substantially constant tensile axial load is maintained on sleeve 235. Sleeve 235 may be a cylinder. The sleeve 235 may be substantially not magnetic defining a substantially non-magnetic wall, for example, made of a non-magnetic material. In certain instances, the sleeve 235 may be made of an electrically conductive material that, although it experiences an associated magnetic field, the effects of such magnetic field can be practically mitigated. The sleeve 235 may include a substantially not conductive wall.

In certain instances sleeve 235 can be a gas-impermeable ceramic and/or glass cylinder maintained "in-compression" for all expected load conditions by an integrated support system, e.g. external compression sleeve 292 for radial support and stub 234-plus-sleeve support ring 270 for axial support. Sleeve 235 including external compression sleeve 292 are ideally made of materials and/or are constructed in such a way as to not significantly obstruct the magnetic field of magnetic coupling 258, and to generate little if any heat from e.g. eddy currents associated with the coupling rotating magnetic field. In certain instances, external compression sleeve 292 can be a composite construct of high strength fibers, such as carbon-fiber, ceramic fiber, basalt fiber, aramid fiber, glass fiber and/or another fiber in e.g. a thermoplastic or thermoset matrix. In certain instances, sleeve 235 can have metalized end surfaces and/or other treatments to facilitate e.g. a metal-to-metal seal with the corresponding surfaces of stub 234 and sleeve support ring 270.

In certain embodiments of subsea fluid system 200 electric machine 202 is filled with gas, e.g. air or an inert gas such as nitrogen or argon, at or near 1-atmosphere pressure. Other than vacuum, which is difficult to establish and maintain, and which provides poor heat transfer properties, a very low gas pressure environment provides the best conditions for operating an electric machine efficiently (e.g. low drag loss, etc.), assuming heat produced by the machine can be removed efficiently.

When submerged in deep water the pressure outside gas-filled electric machine 202 will collapse e.g. electric machine housing 210 if it is not adequately strong or internally supported. In certain embodiments of subsea fluid system 200 electric machine housing 210 is thin and possibly "finned" to improve transfer of heat between electric machine 202 and the surrounding environment. Machine housing 210 may be tightly fit around stator core 222 and sleeves 296, 298, and its ends similarly may be tightly-fit over support surfaces provided on end-bells 214a, 214b. The structures supporting machine housing 210 are sized to be sufficiently strong for that purpose, and where practical (e.g. for sleeves 296, 298) those structures can be made using materials with a useful balance of strength-to-mass and heat-transfer properties (e.g. carbon steel, low alloy steel and select stainless steels, including 316 stainless steel, and high-copper-content materials, including beryllium-copper, respectively, among others).

Figure 2B:
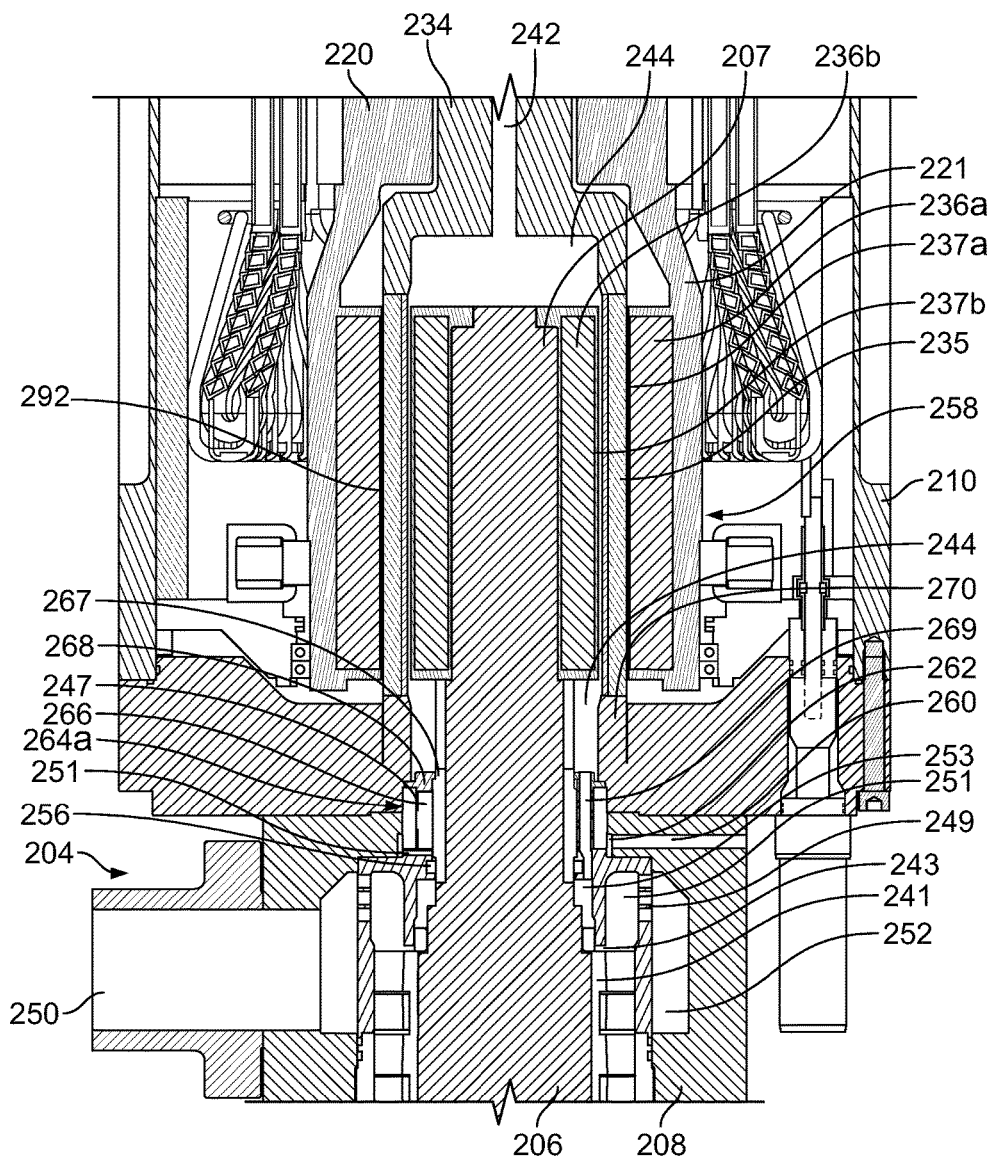
FIG. 2B is a side cross-sectional view of a fluid inlet portion and the magnetic coupling between an electric machine rotor and a fluid-end rotor in the example fluid system of FIG. 2A.

FIG. 2B is a side cross-sectional view of a fluid inlet portion and the magnetic coupling 258 between an electric machine rotor 220 and a fluid-end rotor 206 in an example fluid system 200 of FIG. 2A. Permanent magnets 236a, 236b are affixed to an inner diameter of electric machine rotor shaft 221 and an outer diameter of the upper end 207 of process fluid rotor 206, respectively. Magnets 236a, 236b are unitized to their respective rotors by sleeves 237a, 237b, and those sleeves serve also to isolate the magnets from their respective surrounding environments. Sleeves 237a, 237b are ideally made of materials and/or are constructed in such a way as to not significantly obstruct the magnetic field of magnetic coupling 258, and to generate little if any heat from e.g. eddy currents associated with the coupling rotating magnetic field. In certain instances sleeves 237a, 237b can be cylinders and made from an appropriate non-ferrous metal, e.g. AISI 316 stainless steel or nickel chromium alloy e.g. Inconel (a product of Inco Alloys, Inc.), or they can include a composite construct of high strength fibers such as carbon-fiber, ceramic fiber, basalt fiber, aramid fiber, glass fiber, and/or another fiber in e.g. a thermoplastic or thermoset matrix. Magnetic fields produced by permanent magnets 236a, 236b interact across sleeve 235 to magnetically lock (for rotational purposes) electric machine rotor 220 and process fluid rotor 206, thus forming magnetic coupling 258.

Friction between spinning process fluid rotor 206 and fluid inside coupling chamber 244 tends to "drag" the latter along (in the same direction) with the former (and resists motion of the former, consuming energy), but because friction also exists between static sleeve 235 and said fluid (tending to resist fluid motion), the fluid will typically not spin at the same speed as process fluid rotor 206. Centrifugal forces will be established in the spinning process fluid which will cause heavier elements (e.g. solids and dense liquid components) to move outward (toward sleeve 235) while lighter elements (e.g. less dense liquid components and gas that might have been mixed with heavier elements prior to being "spun") will be relegated to a central core, proximate spinning process fluid rotor 206. The described relative motion between mechanical parts and the fluid, and between different components of the fluid, among other phenomena, produces heat that is later removed from coupling chamber 244 by various mechanisms. Less heat will be generated and less energy will be consumed by spinning process fluid rotor 206 if the fluid proximate spinning process fluid rotor 206 has low density and is easily sheared, which are characteristics of gas. Fluid system 100 can supply gas into coupling chamber 244 whenever gas is available from the process stream, e.g. via stub 234 internal axial conduit 242 (and associated conduits). Regardless the properties of fluid within coupling chamber 244, that (made-hot-by-shearing, etc.) fluid may be displaced with cooler fluid to avoid over-heating proximate and surrounding (e.g. motor) components.

The fluid inlet portion of FIG. 2B is located proximate electric machine 202 and magnetic coupling 258. Process fluid enters fluid-end 204 by three conduits before being combined immediately upstream of first impeller 241 at the all-inlets flows-mixing area 243. Because none of those three flows (described in greater detail below) are typically sourced downstream of subsea fluid system 200, they have not been acted upon by subsea fluid system 200 and do not constitute a "loss" for purposes of calculating overall system efficiency.

The majority of process fluid enters fluid-end 204 via main inlet 250. Coupling coolant enters electric machine 202 via a port 245 in cap 233, and is directed to coupling chamber 244 by conduit 242. Coolant for radial bearing 264a enters through port 260 to join gallery 265, from which it is directed through ports 251 to bearing chamber 247. For the purpose of the current discussion, process fluid entering fluid-end 204 shall be assumed to come from a common source proximate subsea fluid system 200 (not shown in FIG. 2A), and therefore the pressure in main inlet gallery 252, coupling chamber 244 and bearing chamber 247 may be assumed to be approximately the same. The mechanism that causes fluid to enter fluid-end 204 via ports 260 and 245 with slight and "tunable" preference to main inlet 250 is the pressure drop created by inlet homogenizer 249. Pressure inside inlet flow homogenizer chamber 251, and therefore coolant flows mixing chamber 253 (by virtue of their shared influence via the all-inlets flows-mixing area 243) is lower than the source of all inlet flows, which creates a pressure field sufficient to create the desired cooling flows.

For fluid in coupling chamber 244 to reach coolant flows mixing chamber 253 it traverses bearing 264a. It does so via bypass ports 269 provided in cage ring 268. For fluid in bearing chamber 247 to reach coolant flows mixing chamber 253, it first exits chamber 247 by either of two routes. Most fluid exits chamber 247 through the clearance gap between the upper, inner bore of cage ring 268 and the outside diameter of rotor sleeve 267. Once in coupling chamber 244 it mingles with the coupling cooling fluid and reaches the coolant flows mixing chamber via bypass ports 269.

Fluid may also exit bearing chamber 247 by way of seal 256 to emerge in coolant flows mixing chamber 253. An example of a seal that could be used as seal 256 is described more fully below in relation to seal 282 associated with sump top plate 280. Seal 256 has a much smaller clearance relative to rotor sleeve 267 than does cage ring 268 (located at the top of bearing 264a), and has a much lower leakage rate as a result. This configuration encourages fluid entering bearing chamber 247 to exit there-from at the upper end of bearing 264a. That bias in-combination with gravity and centrifugal forces pushing heavier fluid components (e.g. liquids) down and radially outward, respectively, also causes any gas that might be entrained in the fluid stream entering bearing chamber 247 to move radially inward so that it is exhausted immediately past cage ring 268.

Keeping gas out of bearing chamber 247 and removing it quickly should it come to be present in bearing chamber 247 will promote good performance and long life for fluid-film bearing 264a. To increase the likelihood that bearing 264a active surfaces are constantly submerged in liquid (i.e. inside surfaces of tilt-pads 266 and outside surface of rotor sleeve 267 adjacent to tilt-pads 266), tilt-pads 266 are positioned to interact with rotor sleeve 267 on a larger diameter than the gaps (above and below tilt-pads 266) that allow fluid to move out of bearing chamber 247. The natural tendency for gas to separate from liquid and move toward the center of rotation in a rotating fluid system will ensure gas moves out of bearing chamber 247 in advance of liquids whenever gas is present within bearing chamber 247. Adding an additional seal 256 that is positioned above the bearing chamber 247 can improve the ability to manage the gas inherently present in the process stream.

In some embodiments of subsea fluid system 200, process fluid combined immediately upstream of first impeller 241 at the all-inlets flows-mixing area 243 is downstream-thereof increased in pressure by hydraulic stages including impellers secured to process fluid rotor 206 interacting with interspersed static diffusers (a.k.a. stators). Static and dynamic seals are provided at appropriate locations within the hydraulic stages to minimize back-flow from higher-to-lower pressure regions, thereby improving the hydraulic performance of fluid-end 204.

Figure 2C:
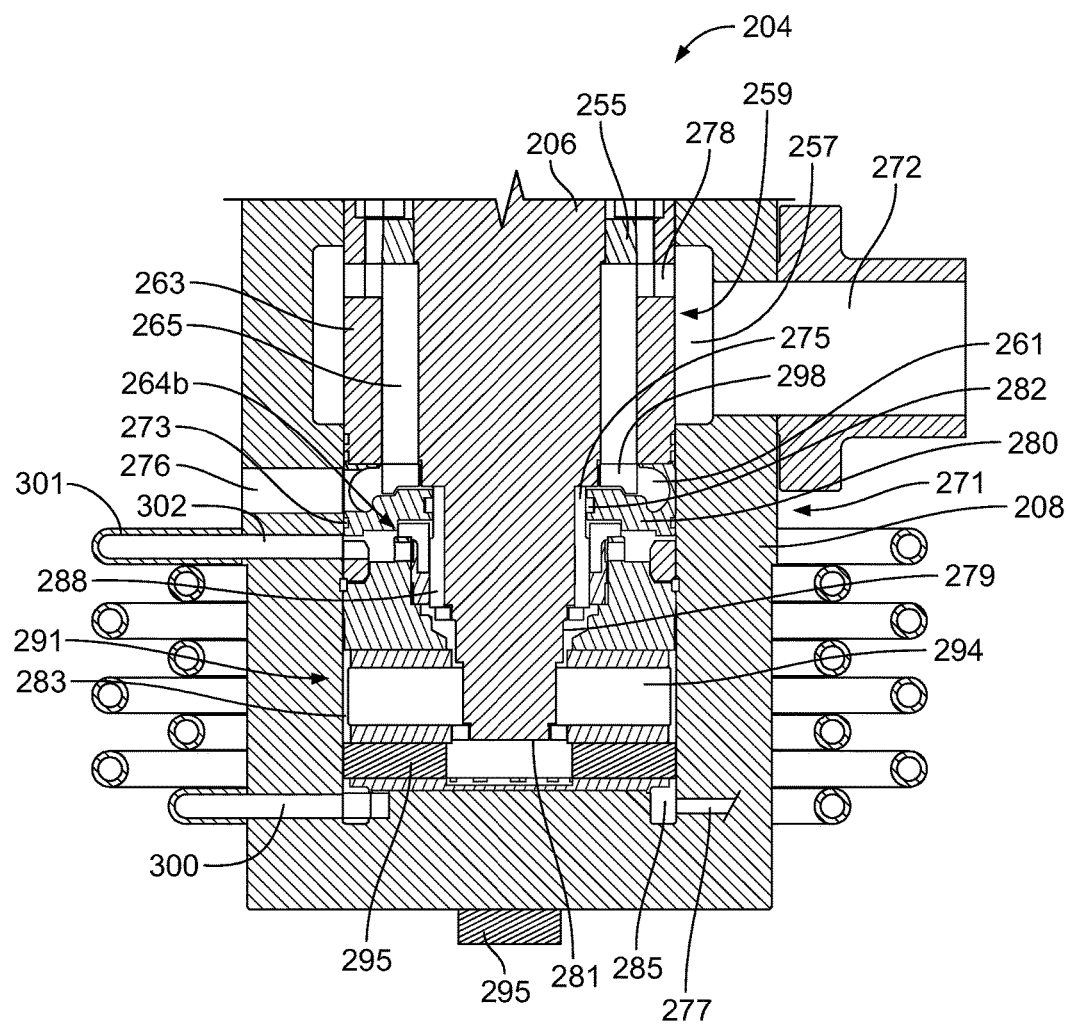
FIG. 2C is a side cross-sectional view of a fluid outlet portion and sump of the example fluid-end of FIG. 2A.

FIG. 2C is a side cross-sectional view of a fluid outlet portion and sump of an example fluid-end 204 of FIG. 2A. There are five main regions of interest in this area separated by two significant functional elements. Those elements are process fluid rotor thrust balance device 259 and sump top plate 280. Above, surrounding and below thrust balance device 259 are final-stage impeller 255, fluid-end 204 outlet gallery 257, and balance circuit outlet device 261 (shown in FIG. 2C as integrated with sump top plate 280, which is not a strict requirement), respectively. Above and below sump top plate 280 are balance circuit outlet device 261 and sump 271, respectively.

The highest pressure in certain embodiments of subsea fluid system 200 may occur immediately downstream of final-stage impeller 255. By passing through openings 278 provided in balance device stator 263, process fluid enters outlet gallery 257 at a slightly lower pressure, and exits into process fluid outlet 272 which is connected to a downstream pipe system. Total pressure change from final-stage impeller 255 to the point of entry to the downstream pipe may be a reduction (small, if e.g. care is taken in design of balance device stator 263 fluid paths 278, volute geometry is provided in outlet gallery 257, and the transition from outlet gallery 257 is carefully contoured, etc.) or an increase (for some embodiments with some fluids for a well-executed volute).

When submersible fluid system 200 is not operating, i.e. when process fluid rotor 206 is not spinning, fluid entering fluid-end housing 208 at inlet 250 and flowing past the hydraulics stages (impellers/diffusers) to exit through outlet 272 will impart relatively little axial force on process fluid rotor 206. When process fluid rotor 206 is spinning, the interaction of the impellers, diffusers and associated components creates pressure fields that vary in magnitude depending on local fluid properties existing at many physical locations within fluid-end 204. Those multiple-magnitude pressure fields act on various geometric areas of process fluid rotor 206 to produce substantial thrust. Such thrust generally tends to drive process fluid rotor 206 in the direction of inlet 250, however various operating scenarios may produce "reverse thrust". Depending on thrust magnitude and direction, thrust bearing 291 may possess sufficient capacity to constrain process fluid rotor 206. In the event thrust acting on process fluid rotor 206 exceeds the capacity of a practical thrust bearing 291, considering the many complex tradeoffs known to those skilled in the art of fluid-ends design, a thrust balance device 259 may be used. Thrust bearing 291 is located near the lower end of fluid-end housing 204. Thrust bearing 291 includes an upward-facing bearing surfaces on thrust collar 294 (coupled to fluid rotor 206), and downward-facing bearing surfaces on the fluid-end housing 208, the bearing surfaces cooperate to support the upward thrust of the fluid rotor 206. Similar components and associated surfaces are provided on the opposite side of thrust collar 294 to resist "reverse thrust" and other scenarios causing fluid rotor 206 to tend to move downward.

Various types of thrust balance devices are known, with the two most common being referred to as "disk" and "piston" (or "drum") types. Each type of device has positive and negative attributes, and sometimes a combination of the two and/or a different device altogether is appropriate for a given application. Embodiments described herein include a piston-type thrust balance device; however, other types may be implemented.

A piston-type thrust balance device is essentially a carefully-defined-diameter radial-clearance rotating seal created between process fluid rotor 206 and a corresponding interface to generate a desired pressure-drop by exploiting pressure fields already existing in fluid-end 204 to substantially balance the thrust loads acting on process fluid rotor 206. The thrust balance device includes two main components (not including process fluid rotor 206), however a fluid conduit (balance circuit conduit 276) connecting the low pressure-side of thrust balance device 259 to inlet 250 pressure is also provided. Balance device rotor 265 is secured to process fluid rotor 206 in a way that provides a pressure-tight seal there-between. As an alternative, the profile of balance device rotor 265 may be provided as an integral part of fluid rotor 206. Balance device stator 263 is secured to fluid-end housing 208 via sealed interfaces with other components. A small clearance gap is provided between balance device rotor 265 and stator 263 to establish a "rotating seal." High pressure from final-stage impeller 255 acts on one side of balance device rotor 265 while low pressure corresponding to that in inlet 250 acts on the other side. Inlet 250 pressure is maintained on the low pressure side of balance device 259 despite high pressure-to-low pressure fluid leakage across the clearance gap (between the balance device rotor 265 and stator 263) because such leakage is small compared to the volume of fluid that can be accommodated by balance circuit conduit 276. Balance circuit outlet device 261 collects and redirects fluid exiting balance device 259 to deliver it to balance circuit conduit 276. The nominal diameter of the clearance gap (which defines the geometric areas on which relevant pressures act) is selected to achieve the desired degree of residual thrust that must be carried by thrust bearing 291 (note that some residual is valuable from bearing loading and rotor dynamic stability perspectives).

Returning briefly to thrust bearing 291, the side that is normally loaded in operation is referred to as the "active" side (upper side in FIG. 2C), whereas the other side is referred to as the "inactive" side. In certain embodiments, the active side of thrust bearing 291 is protected during high-risk long-term storage, shipping, transportation, and deployment activities by maintaining it "un-loaded" during such activities. Specifically, process fluid rotor 206 "rests" on inactive side of thrust bearing 291 whenever subsea fluid system 200 is not operating, e.g. during storage, handling, shipping and deployment. This arrangement is advantageous because design attributes that increase tolerance to e.g. high impact loads during deployment, which however might reduce normal operating capacity, can be implemented for the inactive side of thrust bearing 291 without affecting the operating thrust capacity of fluid-end 204. Such design attributes (among others) may include selection of bearing pad materials that are tolerant of prolonged static loads and/or impact loads, and that however do not have highest-available operating capacity. In addition, one or more energy absorbing devices 295 e.g. dampers, springs, compliant pads (made of elastomeric and/or thermoplastic materials, etc.) and/or "crushable" devices (ref "crumple zones" in automobiles) may be added integral to and/or below thrust bearing 291, as well as external to fluid-end housing 208 (including on skid 110 and/or on shipping stands, running tools, etc.— see damper 120 described in FIG. 1). It may also be advantageous to "lock" rotors 206, 220 so that they are prevented from "bouncing around" during e.g. transportation, deployment, etc., or to support them on "stand-off" devices that prevent e.g. critical bearing surfaces from making contact during such events. Such locking and stand-off functionality may be effected using devices that may be manually engaged and/or released (e.g. locking screws, etc.), or preferably devices that are automatically engaged/disengaged depending on whether rotors 206, 220 are stopped, spinning, transitioning-to-stop or transitioning-to-spin. Devices providing aforementioned attributes include permanent magnet and/or electro-magnet attraction devices, among others ("locking" devices), and bearing-like bushings or pad/pedestal-like supports, among others, that present geometry suitable to the stand-off function while rotors 206, 220 are not spinning and present e.g. "less intrusive" geometry that permits the bearings (intended to support rotors 206, 220 during operation) to effect their function when rotors 206, 220 are spinning ("stand-off" devices). Displacement mechanisms that might enable the "dual-geometry" capability desired for "stand-off" devices include mechanical, hydraulic, thermal, electric, electro-magnetic, and piezo-electric, among others. Passive automatic means for enacting the locking and/or stand-off functions may be used, however a control system may also be provided to ensure correct operation.

Sump top plate 280 in combination with seals 282 and 273 substantially isolate fluid in sump 271 from interacting with fluid-end 204 process fluid. Sump 271 contains fluid-film type radial bearing 264b and thrust bearing 291. To enable good performance and long service life, fluid-film bearings are lubricated and cooled with clean liquid, and process fluid (especially raw hydrocarbon process fluid) may contain large volumes of gas and/or solids that could harm such bearings.

Seal 282 may be substantially the same as seal 256 associated with upper radial bearing 264a described previously. Seal 282 is secured to sump top plate 280 and effects a hydrodynamic fluid-film seal (typically micro-meter-range clearance) relative to rotor sleeve 275 (shown in FIG. 2C as integrated with bearing sleeve 288, which is not a strict requirement) when process fluid rotor 206 is spinning, and also a static seal (typically zero-clearance) when process fluid rotor 206 is not spinning In certain instances, the seal 282 can include a plurality of pads springingly biased inward against the rotor shaft to provide the static seal, but enable formation of the hydrodynamic fluid-film seal when the rotor is rotating. Seal 282 may be designed to maintain, increase or decrease its hydrodynamic clearance, even to zero clearance in operation, when subjected to differential pressure transients from either side (above or below), and therefore to substantially maintain, increase or decrease, respectively, its leakage rate during especially sudden pressure transients. Seal 282 includes features enabling its hydrodynamic performance that allow a small amount of leakage in dynamic (regardless the clearance magnitude relative to rotor sleeve 275) and static modes whenever it is exposed to differential pressure, and therefore it may for some applications be characterized as a flow-restrictor instead of an absolute seal. A small amount of leakage is desired for the sump 271 application. The seals 273 and 282 seal between the fluid-end housing 208 and the fluid rotor 206, and define an upper boundary of a sump 271 of the fluid-end housing 208. A fluid bearing 291 resides in the sump 271 and the seal 282 is responsive to provide a greater seal when subjected to a change in pressure differential between the sump and another portion of the fluid-end housing.

Prior to deployment, and using port(s) 277 provided for such purpose (as well as for refilling sump and/or flushing sump of gas and/or debris, etc.), sump 271 may be filled with a fluid ideally having attractive properties for the target field application, e.g. chemically compatible with process fluid and chemicals that might be introduced into process stream and/or sump 271, density greater than process fluid, useful viscosity over wide temperature range, good heat-transfer performance, low gas-absorption tendency, etc. Following installation and upon commissioning (during which time subsea fluid system 200 is operated), fluid-end 204 will be pressurized in accordance with its design and sump 271 temperature will rise significantly, the latter causing sump fluid to expand. The ability of Seal 282 to transfer fluid axially in both directions ensures pressure in sump 271 will not rise significantly as a result, and further ensures that pressure in sump 271 will substantially match fluid-end 204 inlet 250 pressure during operating and non-operating states, except during process fluid rotor 206 axial position transients (explained below).

The low-leakage-rate, static sealing and hydrodynamic sealing capabilities of seal 282, combined with an otherwise "sealed" sump 271, provide unique and valuable attributes to fluid-end 204. Seal 282 provides a low leakage rate even when subject to sudden high-differential pressure, and therefore equalizes pressure more or less gradually depending mainly on the initial pressure differential and properties of fluid involved (e.g. liquid, gas, multiphase, high/low viscosity, etc.). In one scenario, prior to starting to spin process fluid rotor 206, an operator may inject liquid into port 277 at a rate sufficient to create a pressure differential across seal 282 adequate to elevate process fluid rotor 206, thereby avoiding a potential rotor dynamic instability that might accompany transitioning from the "inactive" side of thrust bearing 291 (not normally used) to the "active" side (used during normal operations) upon start-up. In another scenario, almost the reverse process may be employed. That is, prior to stopping rotation of process fluid rotor 206, liquid may be injected into port 277 at a rate sufficient to maintain elevation thereof. Upon shut-down, process fluid rotor 206 will continue to be elevated until it has ceased to spin, at which point liquid injection through port 277 can be halted to allow process fluid rotor 206 to land softly, without rotation, onto the inactive surfaces of thrust bearing 291. That will reduce damage potential and thereby promote long bearing life. In another scenario, any tendency to drive process fluid rotor 206 into sump 271 ("reverse thrust") will encounter "damped resistance" owing to the fact fluid must typically bypass seal 282 (which happens only slowly) in order for process fluid rotor 206 to move axially. Similar resistance will be encountered if process fluid rotor 206 is motivated to rise quickly from its fully-down position, however fluid must pass seal 282 to enter sump 271 in that case. The foregoing "damped-axial translation" attribute will protect thrust bearing 291 and thereby promote long-life for submersed fluid system 200. In another scenario, in the event process gas permeates sump fluid, and inlet 250 (which dictates sump nominal pressure) is subsequently subject to a sudden pressure drop, seal 282 will only gradually equalize sump pressure to the lower inlet 250 pressure and thereby prevent a sudden expansion of sump gas that might otherwise evacuate the sump. This is a scenario for which designing seal 282 to "reduce its clearance relative to rotor sleeve 275 when subject to differential pressure transients" (described previously) may be applicable. As noted previously, maintaining liquid in sump 271 will facilitate the health of bearings 264b, 291. In any scenario that potentially subjects spinning process fluid rotor 206 to "reverse thrust," pressure higher than at-that-time-present in inlet 250 (and therefore sump 271) may be applied to sump port 277 to resist such "reverse-thrust" and thereby protect e.g. the inactive-side elements of thrust bearing 291. A substantial sensor suite and associated fast-acting control system, possibly including automation algorithms, actuated valves and high pressure fluid source may be used to effect the "process fluid rotor active shaft thrust management" functionality herein described. It shall be understood that similar ability to apply pressure to the top of process fluid rotor 206 (e.g. via supplementary fluid conduit 308 and gas conduit 321 discussed later in this disclosure) may be developed to provide sophisticated "active thrust management" for fluid-end 204.

Significant heat will be generated in sump 271 caused by fluid-shear and other phenomena associated with spinning process fluid rotor 206 and attached thrust collar 294. Cooling sump fluid to optimize its properties for maintenance of bearing performance is achieved by circulating the fluid through a heat exchanger 301 positioned in water surrounding fluid-end 204. Careful positioning of flow paths in and around bearings 264b, 291, and for heat exchanger 301 inlet and outlet ports (302 and 300, respectively), combined with naturally occurring convection currents and aided by e.g. volute-like and/or flow-directing (e.g. circumferential-to-axial) geometry in sump lower cavity 285, will create a "pumping effect" for sump 271. Such pumping effect can be enhanced by adding features, e.g. "scallops", "helixes", "vanes", etc., to the outside of rotating elements including process fluid rotor 206 (e.g. at locations 279, 281; latter on the end-face and/or possibly on an extension of process fluid rotor 206) and/or thrust collar 294 (e.g. at location 283). Alternatively or in addition, an impeller or similar device may be attached to the lower end of process fluid rotor 206.

It is unlikely that process fluid-borne solids of significant size or volume will make their way into sump 271 of fluid system 200. As noted previously, sump 271 is normally pressure-balanced with respect to inlet 250 via balance circuit conduit 276, so there is normally no fluid flow between sump 271 and fluid-end 204 process fluid-containing areas. Additionally, seal 282 allows only small-volume and low-rate fluid transfer there-across (even during high differential pressure transients). Furthermore, a convoluted path with multiple interspersed axial and radial surfaces exists between the underside of balance device rotor retainer 298 and the top of sump top-plate 280, so solids must intermittently move upward against gravity and inward against the centrifugal force before they can approach the top of seal 282. Regardless, two or more ports 277 may be provided to circulate liquid through sump 271 and/or heat exchanger 301 to effectively flush same, at least one port for supplying fluid and one for evacuating fluid (e.g. to any conduit or vessel located upstream of inlet 250 or downstream of outlet 272). Ports 277 may be provided to intersect sump lower cavity 285 (as shown in FIG. 2C), which represents a large diameter and the lowest point in sump 271, and also an area where solids are likely to collect. Alternative locations for ports 277 may also be provided, and may provide additional benefits including an ability to deliver high-rate flow of liquids directly into heat exchanger 301 to flush solids and/or gas (should either of the latter become trapped therein). Note that heat exchanger 301 may take many forms in addition to that shown in FIG. 2C, including some optimized for solids removal and/or gas removal.

Figure 3:
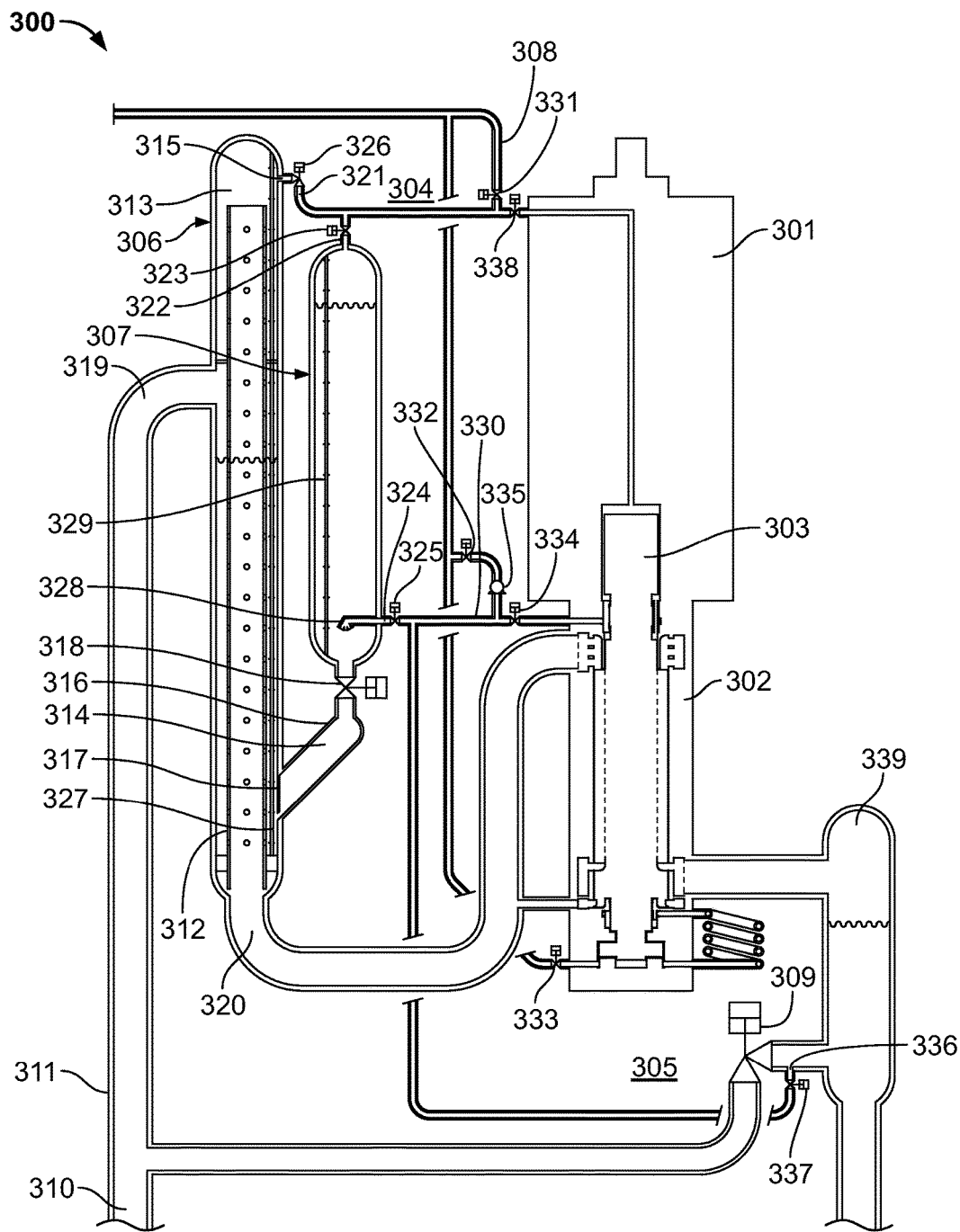
FIG. 3 is a flow schematic of the example fluid system of FIG. 1.

FIG. 3 illustrates an example subsea fluid system 300 that might be packaged within fluid system 100 of FIG. 1 for the purpose of extracting discrete service-fluid streams from a multiphase process stream to serve the needs of specific elements within subsea fluid system 300 (also 200). Subsea fluid system 300 contains an integrated electric machine 301, fluid-end 302 and magnetic coupling 303 as described previously for subsea fluid system 200 of FIGS. 2A-C. It also contains upstream and downstream processing packages 304 and 305, respectively. Upstream processing package 304 includes a buffer tank 306, a liquid reservoir 307, a supplementary fluid conduit 308 and a selection of flow control devices and interconnecting pipe-work, of which various elements will be described later in this disclosure. Downstream processing package 305 contains a liquid extraction unit 339 and a flow regulating device (a.k.a. choke or process control valve) 309. An optional downstream service conduit 336 including isolation valve 337 may be provided to connect liquid extraction unit 339 with e.g. liquid conduit 330 (for reasons explained below).

Multiphase fluid enters subsea fluid system 300 at inlet 310 for transport through inlet pipe 311 to buffer tank 306. Raw hydrocarbon production fluids delivered to subsea fluid system 300 from wells, directly or by way of e.g. manifolds, may at various times include as much as 100% gas or 100% liquids, as well as all fractional combinations of gas and liquids (often with some volume of solids in addition). Transition between gas-dominated and liquid-dominated multiphase streams may occur frequently (e.g. time frame of seconds or less) or rarely, and such transitions may be gradual or abrupt. Abrupt changes from very high Gas Volume Fraction (GVF) streams to very low GVF streams, and vice-versa (typically referred to as "slugging"), can be harmful to submersed fluid system 300 for reasons known to those skilled in the art of fluid-boosting devices and associated pipe systems. Buffer tank 306 can accommodate even rapidly changing fluid conditions at inlet 319 and reduce the abruptness of such fluid condition changes at its main outlet 320, and in so doing moderate the detrimental effects on downstream fluid system 300. Buffer tank 306 amounts to a "fat spot" in inlet pipe 311 that allows fluid to reside there long enough for gravity to drive heavier streams/elements (liquid, solids) to the bottom of the tank while simultaneously forcing gas to rise to the top of the tank. A perforated stand-pipe 312 or similar device controls the rate at which the separated streams/elements are rejoined before exiting the tank at main outlet 320. Notably, when a high-GVF multiphase flow stream enters buffer tank 306 the volume of gas in the tank may increase relative to the volume of liquid/solids already in the tank, and similarly when a low-GVF stream enters the tank the opposite may occur. Meanwhile, the GVF of the fluid exiting the tank will typically be different from that entering because the exit-stream GVF is automatically (and gradually) adjusted in accordance with the volume of gas and liquid/solids permitted to enter perforated stand-pipe 312. The gas/liquid interface level in buffer tank 306 dictates the flow area (number of holes) accessible to each stream.

In certain embodiments of subsea fluid system 300, separated gas 313 and separated liquid 314 may be extracted from buffer tank 306 through gas-tap 315 and liquid-tap 316, respectively. It is beneficial that no solids enter conduits downstream of gas-tap 315 and liquid tap 316. Solids in the fluid stream entering buffer tank 306 will typically be carried there-through with the liquid phase(s), therefore, while some scenarios may be envisioned for which solids may enter gas-tap 315 (typically accompanied by liquids) or be formed in gas conduit 321, subsea fluid system 300 is operated to minimize the chance for those scenarios occurring. The large size of liquid-tap 316 relative to the small size of, and flow rate in, conduits downstream thereof enables a substantially quiescent environment to establish within liquid-tap 316 that allows solids to settle-out therein. The steep angle of liquid-tap 316 suggested in FIG. 3 promotes gravity-driven return of settled-solids to the main chamber of buffer tank 306, from which they can subsequently exit through main outlet 320. Baffle(s) 317 and/or similar device(s) and/or features may be added to liquid-tap 316 to enhance the solids-separation effect and/or otherwise inhibit transfer of solids to areas downstream of liquid-tap 316.

Downstream of liquid-tap 316 is normally-open valve 318 through which ideally only liquid will pass to enter liquid reservoir 307. Level monitor 327 provides the sensory feedback needed for an associated control system to command valve 318 to close if buffer tank 306 liquid level gets close to liquid-tap 316 level and threatens to permit an unacceptable volume of gas to enter liquid reservoir 307 by that route. Liquid reservoir 307 and the conduit including valve 318 may be vertically oriented, and they are attached to liquid-tap 316 in such a way that solids possibly remaining in fluid delivered to those spaces may settle and drop into liquid-tap 316 (and subsequently, buffer tank 306) so as not to be carried downstream of liquid reservoir 307. Fluid in liquid reservoir 307 will typically be quite still and under certain circumstances reside therein for several minutes before the liquid phase makes its way further downstream, substantially free of solids and free-gas.

There are two other flow paths into/out-of liquid reservoir 307, specifically gas conduit-link 322 with normally-open isolation valve 323 and liquid conduit-link 324 with normally-open isolation valve 325. It is beneficial that only gas flows through gas conduit-link 322, and that only liquid flows through liquid conduit-link 324. Level monitor 329 provides the sensory feedback needed for an associated control system to command valve 325 to close if liquid reservoir 307 liquid level gets close to liquid conduit-link 324 level and threatens to permit free-gas to enter there-into. The main scenario for which valve 323 might be closed is related to flushing of solids from liquid reservoir 307, which is described elsewhere in this disclosure.

Liquid reservoir 307 liquid level may be forced higher in an absolute sense than that in buffer tank 306 by manipulating isolation valves 323, 325 and gas flow-control device (a.k.a. choke or process control valve) 326. Maintaining liquid reservoir 307 substantially full of liquid is necessary for optimum performance. Using choke 326 to reduce pressure in gas conduit 321 relative to pressure in buffer tank 306 (therefore also in liquid tap 316 and liquid reservoir 307) will cause fluid in liquid reservoir 307 to flow toward (into) gas conduit 321. Gas in liquid reservoir 307, whether introduced through liquid tap 316 (as free-gas or gas-in-solution) or gas conduit-link 322, will naturally collect near the top of liquid reservoir 307 and therefore be exhausted into gas conduit 321 before liquids entering from below during the "liquid reservoir filling" process. Level monitor 329 provides the sensory feedback needed to effect a level-control system for liquid reservoir 307.

Liquid reservoir 307 is provided to hold a volume of liquid sufficient to lubricate bearing 264a (referred to with respect to the description of FIG. 3, but shown in FIG. 2B) for a specific period of time in the event liquid ceases to be available from buffer tank 306 for such period of time. The period of time depends on several factors of which liquid reservoir 307 size, pressure drop across fluid-end inlet homogenizer 249, leakage rate from bearing chamber 247, rate of fluid exiting coupling chamber 244 via bypass ports 269, and liquid viscosity are some. Knowing the flow behavior and physical properties of process fluids entering inlet 310 allows for correctly sizing liquid reservoir 307. Recognizing it is difficult to predict such attributes for new producing fields, and to predict how such attributes may vary over the many years most fields are expected to produce, in-field replacement of liquid reservoir 307 with e.g. a larger unit, independent of other elements within submersible fluid system 300, 100 and/or in-combination with other elements within submersible fluid system 300, 100, may be enabled. While specific in-field-replacement-enabling features for liquid reservoir 307 are not described in detail in this disclosure (FIG. 1 shows process connectors 115 suggesting how such capability may also be provided for fluid system 100 containing liquid reservoir 307), it shall be obvious to one skilled in the art of designing modular, replaceable submersible systems how such capability may be effected.

Nozzle 328 is the inlet to liquid conduit-link 324, and it may also be used as an outlet device for a function described later in this disclosure. It may be configured in any number of ways and/or associated with devices e.g. baffles and/or deflectors to passively resist intake of solids that might remain in liquid entering or stored in liquid reservoir 307. Typically one or more substantially side-directed or down-ward-directed ports may be used instead of a port or ports angled upward to avoid the undesirable tendency of the latter alternatives to collect solids that might settle-out of liquid reservoir 307 fluids, then transfer such solids to elements downstream thereof. One or more of any number of filtering features and/or devices may also be provided to resist intake of solids, regardless the orientation of the noted ports.

Unless forced to behave otherwise by e.g. a flow restriction and/or added flow-boosting device, fluid (e.g. liquid) will exit liquid reservoir 307 to flow through liquid conduit 330 into bearing 264a at a rate dictated at least by pressure drop across fluid-end inlet homogenizer 249, leakage rate from bearing chamber 247, rate of fluid exiting coupling chamber 244 via bypass ports 269, and liquid viscosity. Isolation valves 331, 332, 333 associated with supplementary fluid conduit 308 are normally closed, and therefore do not normally affect flow rate through liquid conduit 330 (or gas conduit 321). Normally-open isolation valve 334, when closed or substantially closed, enables fluid supplied from a source capable of delivering fluid at pressure greater than that in buffer tank 306, such as supplementary fluid conduit 308 or downstream service conduit 336 (when accessed by opening normally-closed isolation valve 337), to be directed into liquid reservoir 307 via nozzle 328 to e.g. fill liquid reservoir 307 with liquid and/or to flush solids out of liquid reservoir 307 (past valve 318 into liquid-tap 316 and into buffer tank 306). If it is desired to increase pressure in liquid conduit 324 upstream of closed or substantially closed isolation valve 334 to e.g. create or intensify a "jetting action" produced by e.g. nozzle 328, a pump 335 may be added (typically not required for downstream service conduit 336, however possibly useful for supplementary fluid conduit 308). An alternative to isolation valve 334 is a choke or a process control valve, which is generally better able to accommodate partial opening and associated potentially large pressure drop without suffering significant wear. Such alternative choke or process control valve, when associated with suitable instrumentation e.g., upstream, downstream and/or differential pressure sensors, and control algorithms (controller) facilitates increased controllability of liquid flow provided to bearing 264a, and therefore the rate of consumption of liquid in liquid reservoir 307.

A sufficiently sophisticated control system possibly including automation algorithms will be able to operate the various valves and especially chokes/process control valves (326 and that which is an alternative to isolation valve 334) to optimize coolant flows for bearing 264a and magnetic coupling 258, and possibly to effect "active thrust management" for fluid-end rotor 206. The controller may be configured to receive gas and liquid pressure information and e.g. component position information, etc., from one or more sensors located at relevant points within submersible fluid system 200 and further configured to control one or more pressure regulating devices to adjust gas or liquid pressures in the submersible fluid system. In some applications the cost to obtain the flexibility and performance enhancement delivered by an instrumented choke, process control valve or other variable-position valve (an option for isolation valve 334) is not justified, and a fixed flow restriction (e.g. orifice or venturi) or no flow restriction may be adequate to ensure an acceptable supply of liquid is delivered to bearing 264a. Regardless, at least an open/close-type isolation valve 334 may be used to enable direction of fluids in the manner and for the same purpose described below for isolation valve 338.

Normally-open isolation valve 338 is provided in gas conduit 321 so that it may be closed on select specific occasions, e.g. following shut-down of submersible fluid system 200 when the duration of such shut-down is expected to be sufficiently long that process fluids may undergo property changes that might be detrimental to subsequent operation of fluid system 300 (and 200). With isolation valve 338 closed, chemicals supplied by supplementary fluid conduit 308 can be routed selectively to alternative locations throughout submersible fluid system 300 to displace potentially undesirable process fluids and/or to otherwise protect against undesirable consequences, e.g. formation of hydrates, wax, etc. Note that the ability to provide heat to critical locations within submersible fluid systems described herein may be desirable, and may be accomplished using known techniques e.g. electric heat-tracing and/or heated fluids circulated through dedicated conduits, etc.

Several functions have been described already for supplementary fluid conduit 308. Another function is to provide liquid to bearing 264a for as long as necessary in the event liquid becomes unavailable on a continuous basis from buffer tank 306 and for an additional period of time from liquid reservoir 307 (e.g. limited by its size). The facilities supplying supplementary fluid conduit 308, e.g. topside hydraulic power unit (HPU) and associated electric power supply, plus a single or multi-conduit umbilical to transport the chemicals from the HPU to proximate the underwater points of use, are provided for subsea production systems as a matter of course to provide mitigation of potential "flow assurance" issues such as those mentioned throughout this disclosure (e.g. hydrates, wax, scale, etc.). Multiphase-process-fluid-capable submersible fluid systems described herein do not require that an additional topside HPU, electric power supply, umbilical conduits, and other expensive equipment (known as a "barrier fluid system") be provided to cool and lubricate their bearings and other sensitive components.

Fluid systems disclosed herein are sophisticated devices designed to perform complex and challenging functions reliably over extended periods of time. They contain many active devices including electric machines, fluid-ends, auxiliary pumps, valves and sensing instruments, among others. Condition and Performance Monitoring (CPM) of such devices and sub-systems is recommended, and that requires that equally sophisticated data collection, reduction, historian, control and potentially automation systems be implemented.

A number of embodiments have been described. Nevertheless, it will be understood that various modifications may be made. Accordingly, other embodiments are within the scope of the following claims.

What is claimed is:

1. A submersible fluid system for operating submersed in a body of water, the system comprising:
   a fluid-end comprising a fluid rotor disposed in a fluid-end housing;
   an electric machine housing coupled to the fluid-end housing and comprising a hermetically sealed cavity;
   an electric machine disposed entirely within the hermetically sealed cavity of the electric machine housing, the electric machine comprising an electric machine stator and an electric machine rotor; and
   a magnetic coupling that couples the electric machine rotor and the fluid rotor, the magnetic coupling comprising a magnet within the hermetically sealed cavity of the electric machine housing, the magnet coupled to the electric machine rotor;
   wherein the hermetically sealed cavity of the electric machine housing contains a gas at a pressure that is less than a pressure of a fluid entering the fluid rotor of the fluid-end and less than a hydrostatic pressure of a fluid surrounding the electric machine housing when submerged at a specified depth.

2. The system of claim 1, wherein the magnetic coupling further comprises:
   a magnet coupled to the fluid rotor and in magnetic interaction with the magnet of the electric machine rotor.

3. The system of claim 1, further comprising a substantially non-magnetically conductive wall between a magnet of the electric machine rotor side of the magnetic coupling and a magnet of the fluid rotor side of the magnetic coupling.

4. The system of claim 3, wherein:
   a drive-end of the fluid rotor extends into an interior bore of the electric machine rotor and the magnet of the fluid rotor is coupled to an exterior of the drive-end;
   the magnet of the electric machine rotor resides in the interior bore of the electric machine rotor; and
   the wall comprising a substantially non-magnetically conductive cylinder is disposed within the interior bore of the electric machine rotor.

5. The system of claim 4, wherein the cylinder comprises at least one of a gas impermeable ceramic or glass inner sleeve within a fiber-matrix composite outer sleeve.

6. The system of claim 5, wherein the outer sleeve compressively strains the inner sleeve.

7. The system of claim 4, wherein the cylinder comprises at least one of gas impermeable ceramic or glass inner sleeve within a fiber-matrix composite outer sleeve, and
   at least one of the inner or outer sleeves comprises a seal surface about one end and a seal surface about an opposite end.

8. The system of claim 4, wherein the hermetically sealed cavity of the electric machine housing contains a gas at a pressure of at or near 1-atmosphere and an interior of the cylinder contains a fluid at a pressure at or near the pressure of fluid entering the fluid rotor of the fluid-end.

9. The system of claim 1, wherein the electric machine comprises a magnetic bearing supporting the electric machine rotor to rotate within the electric machine stator, and the bearing is wholly contained within the hermetically sealed cavity.

10. The system of claim 1, further comprising a plurality of seals sealing the hermetically sealed cavity, and wherein the seals are entirely static seals.

11. The system of claim 10, wherein at least one of the seals comprises a metal-to-metal seal.

12. The system of claim 1, wherein the electric machine rotor comprises a permanent magnet that interacts with the stator to at least one of rotate the electric machine rotor relative to the stator or generate electricity when moved relative to the stator.

13. The system of claim 1, wherein the electric machine comprises a motor and the fluid rotor comprises one or more of a pump rotor or a compressor.

14. The system of claim 1, wherein the electric machine comprises a generator.

15. A submersible fluid system for operating submersed in a body of water, the system comprising:
   a fluid-end comprising a fluid rotor disposed in a fluid-end housing;
   an electric machine housing coupled to the fluid-end housing and comprising a hermetically sealed cavity;
   an electric machine disposed entirely within the hermetically sealed cavity of the electric machine housing, the electric machine comprising an electric machine stator and an electric machine rotor; and
   a magnetic coupling that couples the electric machine rotor and the fluid rotor;
   further comprising a substantially non-magnetically conductive wall between a magnet of the electric machine rotor side of the magnetic coupling and a magnet of the fluid rotor side of the magnetic coupling;
   a drive-end of the fluid rotor extends into an interior bore of the electric machine rotor and the magnet of the fluid rotor is coupled to an exterior of the drive-end;
   the magnet of the electric machine rotor resides in the interior bore of the electric machine rotor;
   the wall comprising a substantially non-magnetically conductive cylinder is disposed within the interior bore of the electric machine rotor; and
   further comprising a support extending from an end of the electric machine housing toward the fluid-end housing and clamping to axially strain the substantially non-magnetically conductive cylinder between the support and the fluid-end housing.

16. The system of claim 15, wherein the support is spring biased toward the fluid-end housing.

17. The system of claim 15, further comprising a fluid passage through the support and into an interior of the substantially non-magnetically conductive cylinder, the fluid passage coupled to receive fluid from an exterior of the system and communicate the fluid to an interior of the cylinder.

18. The system of claim 17, wherein the fluid comprises substantially gas.

19. A method of coupling an electric machine to a fluid-end in a submersible fluid system, the method comprising:
   maintaining a rotor of the electric machine in an area of a first pressure in a hermetically sealed cavity defined by an electric machine housing, the rotor hermetically sealed from a fluid rotor of the fluid-end in an area of a second, different pressure, the rotor comprising a rotor permanent magnet in the hermetically sealed cavity defined by the electric machine housing; and
   coupling the rotor of the electric machine to the fluid rotor with a magnetic coupling through a stationary wall between the rotor of the electric machine and the fluid rotor;
   wherein the first pressure is less than the second pressure, and the first pressure is less than a hydrostatic pressure of a fluid surrounding the electric machine housing when submerged at a specified depth.

20. The method of claim 19, comprising sealing the area containing the rotor of the electric machine from the area containing the fluid rotor entirely with static seals.

21. The method of claim 20, comprising maintaining a stator of the electric machine in the area of the first pressure.

22. A fluid system, comprising:
   a pump shaft contained in a submersible pump housing, the pump shaft having a pump permanent magnet;
   a rotor extending from an end of an electric machine housing, the rotor having a rotor permanent magnet and residing in a hermetically sealed cavity defined by the electric machine housing; and
   the pump permanent magnet residing proximate to the rotor permanent magnet communicating magnetic flux between the rotor permanent magnet and the pump permanent magnet and coupling the pump shaft with the rotor;
   wherein the hermetically sealed cavity of the electric machine housing contains a gas at a pressure that is less than a pressure of a fluid entering the fluid rotor of the fluid-end and less than a hydrostatic pressure of a fluid surrounding the electric machine housing when submerged at a specified depth.

23. The fluid system of claim 22, wherein the rotor is configured to rotate within a stator, and the magnetic coupling couples the rotor to the pump shaft to rotate the pump shaft at the same speed as the rotor.

* * * * *